United States Patent [19]

Iura et al.

[11] 4,021,828
[45] May 3, 1977

[54] FILM COUNTER

[75] Inventors: Yukio Iura, Yokosuka; Masayoshi Yamamichi, Kawasaki; Takashi Uchiyama, Yokohama; Tetsuya Taguchi, Kawasaki; Yukio Mashimo, Tokyo, all of Japan

[73] Assignee: Canon Kabushiki Kaisha, Japan

[22] Filed: Feb. 3, 1975

[21] Appl. No.: 546,562

[30] Foreign Application Priority Data

Feb. 13, 1974 Japan .................... 49-17921
July 10, 1974 Japan .................... 49-78989
July 11, 1974 Japan .................... 49-79523

[52] U.S. Cl. .................. 354/217; 235/92 MP; 340/221; 354/289
[51] Int. Cl.² ...................... G03B 17/36
[58] Field of Search .......... 354/217, 218, 215, 289, 354/60 E, 60 L, 23 D; 235/92 MP; 116/73, 114 J; 340/221

[56] References Cited

UNITED STATES PATENTS

| | | |
|---|---|---|
| 3,346,725 | 10/1967 | Allured et al. ............... 235/92 MP |
| 3,511,153 | 5/1970 | Steisslinger et al. ............ 354/217 |
| 3,882,512 | 5/1975 | Lawrence et al. ............. 354/23 D |

Primary Examiner—L. T. Hix
Assistant Examiner—J. A. LaBarre
Attorney, Agent, or Firm—McGlew and Tuttle

[57] ABSTRACT

An electrical film counter for a photographic camera is provided with a differentiating circuit responsive to a film winding operation for producing an output pulse. The number of output pulses from the differentiating circuit is counted by an UP-DOWN counter and is decoded by a decoder designed to drive an indicator which indicates the number of film frames advanced through the film gate of the camera.

14 Claims, 9 Drawing Figures

FILM COUNTER

BACKGROUND OF THE INVENTION

1. Field of the Invention

This invention relates to photographic cameras, and more particularly to a film counter capable of digitally indicating the number of film frames advanced past the film gate of a camera.

2. Description of the Prior Art

The conventional film counters generally employ a mechanical linkage through which the film winding mechanism drives a ratchet mechanism associated with a film frame indicator so that, each time when the film transport and shutter cocking lever is actuated to advance one frame of film, the ratchet mechanism operates causing the indicator to advance one graduation, thus counting the number of film frames advanced past the film gate of the camera. With this arrangement, however, the film frame indicator must be positioned near the sprocket or drive shaft of the film winding mechanism to minimize the complexity of the mechanical linkage, thereby limiting the flexibility of the camera design. Another disadvantage of the mechanically operating film counter is that the camera must be designed with a large space therein for incorporation of the counter, whereby the bulk of the camera being unavoidably increased.

SUMMARY OF THE INVENTION

An object of the invention is to provide a compact film counter.

Another object of the invention is to provide a film counter, which counts the number of advanced film frames through the use of electrical circuits, which provides a design flexibility allowing camera structures of reduced size.

Still another object of the invention is to provide a film counter of the type described in which the indication for the number of advanced film frames is effected by the use of electrical indicating means.

Other objects, features and advantages of the invention will become apparent from the following detailed description of a preferred embodiment of the invention taken in conjunction with the accompanying drawings.

DESCRIPTION OF A PREFERRED EMBODIMENT

Figure 1:
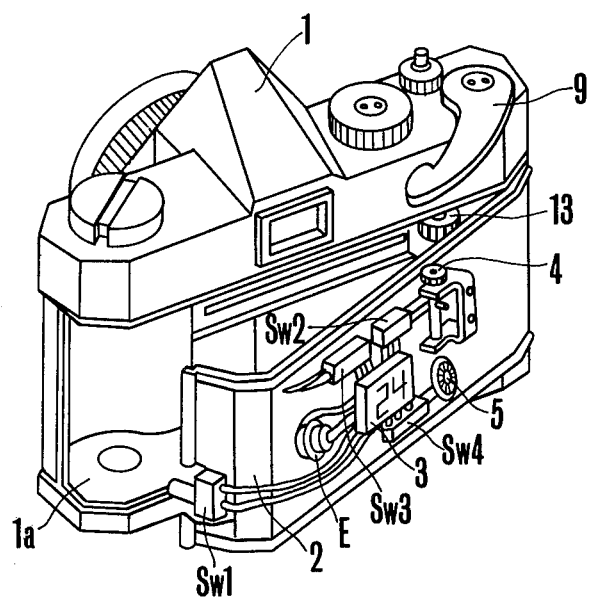
FIG. 1 is a perspective view of a single lens reflex camera utilizing a film counter constructed in accordance with a preferred embodiment of the invention.
Figure 2:
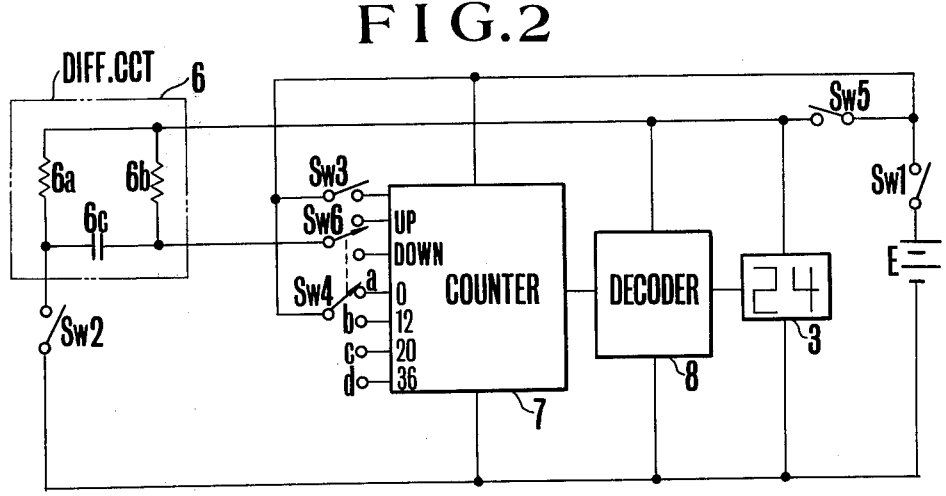
FIG. 2 is a schematic block diagram of circuitry suitable for use in the film counter of FIG. 1.

Referring to FIGS. 1 and 2, there is shown one embodiment of a film counter according to the present invention is applied to a single lens reflex camera which is indicated at 1. The camera 1 is provided with a film cartridge chamber 1a defined within the housing thereof. A hinged back cover 2, constituting part of the camera housing, is provided with a film counter of the invention mounted on the inside wall thereof and with an indicator 3 arranged in the outside cover wall so that the number of film frames advanced past the film gate of the camera 1 can be read out from the outside of the camera. The film counter includes a differentiating circuit 6 connected between the positive and negative buses, the positive bus being connected through two switches $SW_1$ and $SW_5$ to the positive terminal of an electric power source E such as a mercury battery and the negative bus being connected through a switch $SW_2$ to the negative terminal of battery E, and an UP-DOWN counter 7 connected to the battery E through the switch $SW_1$ and having an output terminal connected to an input terminal of a decoder 8 which is designed to drive the indicator 3 which may be constructed with luminous diode, liquid crystal, or electrochromy, each of the decoder 8 and indicator 3 being connected between the positive and negative buses. The first switch $SW_1$ is arranged on the inside wall of the back cover 2 to be closed when the back cover 2 is closed and when a film cartridge not shown is loaded in the chamber 1a. The second switch $SW_2$ is arranged to cooperate with a gear mechanism 4 in a manner such that one revolution of the gear engaging the perforation holes of the film causes an instantaneous closure of switch $SW_2$ as the film is advanced one frame by the film winding mechanism 13, 9 of the camera 1. There are further provided a third switch $SW_3$, connected between the reset terminal of the UP-DOWN counter 7 and the interconnection between switches $SW_1$ and $SW_5$ and arranged so that, when the back cover 2 is opened, switch $SW_3$ closed to reset the counter 7 to zero, and a fourth switch $SW_4$ connected between the counter 7 and the interconnection between switches $SW_1$ and $SW_5$ to set the counter 7 in accordance with the maximum number of film frames available in the used film cartridge, for example, 12 frames, 20 frames or 36 frames. The fifth switch $SW_5$ is arranged to be actuable from the outside of the camera by the camera operator when he desires to read out the number of film frames advanced past the film gate, thereby whereby the electrical energy which would be otherwise wastefully used up by the indicator 3 can be saved, and to be cooperative with the second switch $SW_2$ in a manner such that switch $SW_5$ is closed in response to the instantaneous closure of switch $SW_2$ but switch $SW_2$ is not closed in response to the closure of switch $SW_5$. The differentiating circuit 6 comprises two resistors 6a and 6b connected in parallel to the battery E and a capacitor 6c connected between the resistors 6a and 6b. The input terminal of differentiating circuit 6 is connected to switch $SW_2$. The output terminal of the differentiating circuit 6 is connectable to either the UP-input or the DOWN-input terminals of counter 7 through the sixth switch $SW_6$ which serves as a change-over means and is arranged to be operable by means of a selector switch knob 5 and to cooperate with switch $SW_4$ in a manner such that, when switch $SW_6$ is set to the UP-input terminal, switch $SW_4$ is set to the position $a$ for setting the counter 7 to zero, while when switch $SW_6$ is set to the DOWN-input terminal, switch $SW_4$ is set to one of the positions $b$, $c$ and $d$ for setting the counter to respective values corresponding to the maximum number of film frames available in the used film cartridge.

The operation of the film counter of FIGS. 1 and 2 is as follows. In order that the UP-DOWN counter 7 counts up the number of output pulses from the differentiating circuit 6 as corresponding to the number of film frames advanced past the film gate of the camera 1, the operator turns the knob 5 to set the switch $SW_6$ to the position for connection of the output terminal of differentiating circuit 6 to the UP-input terminal of counter 7. Next the back cover 2 is opened to load a new film cartridge in the chamber 1a, whereupon the reset switch $SW_3$ is closed to reset the counter 7 to zero, and the power switch $SW_1$ is opened. After the film cartridge has been loaded and the roll film contained therein has been installed in the film channel passing through the film gate while its perforation holes engage the sprocket 13 of the film winding mechanism (FIG. 3), the back cover 2 is closed, whereby the gear 4 is brought into engagement with the perforation holes of the film, switch $SW_1$ is closed in engagement with a portion of the film cartridge housing, and switch $SW_2$ is opened. After an exposure has been completed, the film transport and shutter cocking lever 9 may be actuated to advance the film one frame causing the gear 4 to rotate one revolution. Such rotation of the gear 4 causes an instantaneous closure of switch $SW_2$ which then causes the differentiating circuit 6 to generate an output pulse which is applied through switch $SW_6$ to the UP-input terminal of counter 7. As each frame of the film is advanced in sequence, such prodedure repeats itself causing the differentiating circuit 6 to generate output pulses in sequence which are counted up by the counter 7 and then decoded by the decoder 8 to drive the indicator 3 for displaying the number of advanced film frames which can be seen when the switch $SW_5$ is manually depressed. After all of the available film frames have been exposed, the operator may open the back cover 2, whereupon the counter 7 is reset to zero.

Figure 3:
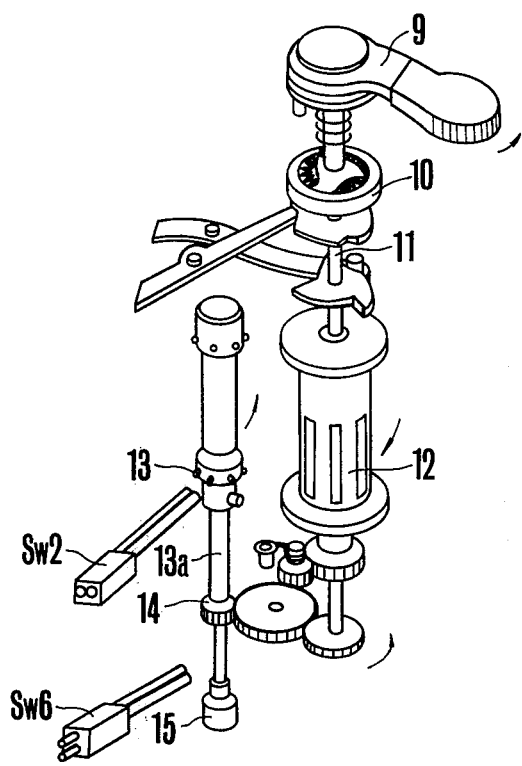
FIG. 3 is a fragmentary schematic perspective view illustrating the cooperation of the actuating member of the circuitry of FIG. 2 with the film winding mechanism of a camera of FIG. 1.

In the case of a camera provided with a film rewinding button 15 as shown in FIG. 3, after all of the available film frames has been exposed, the operator may depress this button 15 to free the sprocket 13 from the sprocket driving gear 14 to rewind the advanced film on the initial reel of the film cartridge. In this camera, switch $SW_6$ is arranged to cooperate with the button 15 in a manner such that, when the button 15 is depressed, switch $SW_6$ is switched from the UP-input to the DOWN-input. Therefore, as the film is rewound, instantaneous closures of switch $SW_2$ successively occur in a manner similar to that in the film winding operation, causing the differentiating circuit 6 to generate output pulses which are counted down by the counter 7, and the count-down is displayed by the indicator 3 so long as the switch $SW_5$ is closed.

In order that the indicator 3 displays the number of film frames which remain unexposed, the operator turns the knob 5 to set the switch $SW_6$ to the position for connection of the output terminal of differentiating circuit 6 to the DOWN-input terminal of counter 7. In this case, switch $SW_4$ is assumed to be set in position $d$ corresponding to 36 frames. Next the back cover 2 is opened to replace the previously loaded film cartridge by a new one, whereupon the reset switch $SW_3$ is turned on to reset the counter 7 to zero, and the power switch $SW_1$ is opened. After the new film cartridge has been loaded and the film contained therein has been installed in the film channel passing through the film gate while its perforation holes engage the sprocket 13, the back cover 2 is closed, whereupon switch $SW_1$ is closed and switch $SW_3$ is opened. At this time, the manual closure of switch $SW_5$ causes the indicator 3 to display a numeral character 36 because of the setting of switch $SW_4$ to the preset terminal $d$ of counter 7. As the film is advanced, the differentiating circuit 6 produces output pulse which are counted down by counter 7 so that the numerals displayed by the indicator 3 decrease one by one. It is to be noted that the various elements other than the UP-DOWN counter 7, which also performs a function of storing the counted result, are cut off from the power source E during the time interval between two successive film winding operations irrespective of whether switch $SW_6$ is set for connection to the UP-input terminal of the DOWN-input terminal of counter 7, whereby the wasteful consumption of the battery E otherwise encountered through the various elements of the film counter other than the UP-DOWN counter can be minimized.

The invention has been described above in connection with a purely schematic example which can be changed in many ways. For example, instead of using the gear mechanism 4 as an actuating member for the switch $SW_2$, it is possible to utilize the shaft 13a of sprocket 13 or the sprocket gear 14 of the film winding mechanism of FIG. 3 in which the cocking movement of lever 9 is transmitted through a one-direction clutch 10 to the drive shaft 11 for a spool 12 and therefrom to the sprocket shaft 13a through a gear arrangement including gear 14.

Figure 4:
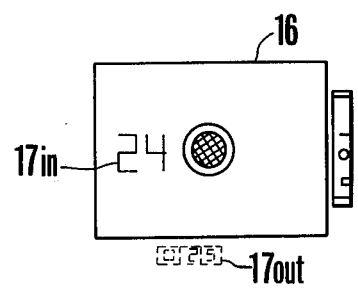
FIG. 4 is a plane view of the view field in the camera finder adapted to indicate the number of advanced film frames in or outside of the view field thereof.
Figure 5:
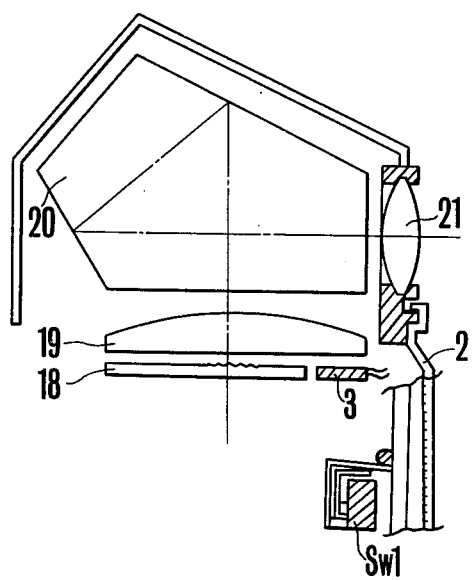
FIG. 5 is a sectional view of a camera finder adapted to indicate the frame number outside the view field thereof.
Figure 6:
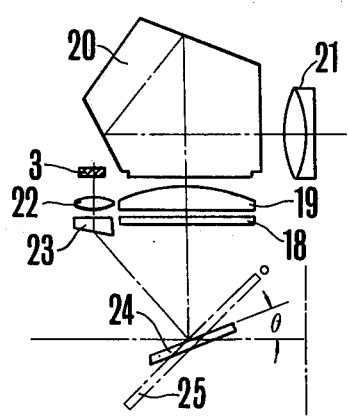
FIG. 6 is a block diagram of a camera finder adapted to indicate the frame number within the view field thereof.
Figure 7:
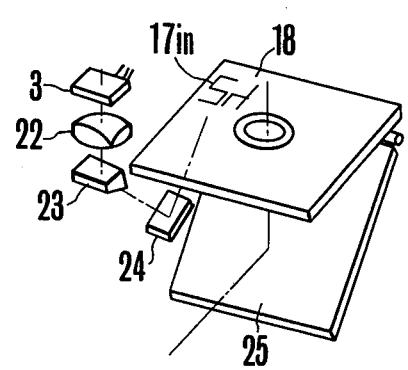
FIG. 7 is a fragmentary perspective view of the finder of FIG. 6.

Further, instead of arranging the indicator 3 in the back cover 2, it is possible to arrange it in the fiew finder of the camera 1, so that the digital indication is effected within the view field 16 of the finder (17in) or outside thereof (17out) as shown in FIG. 4. In the latter connection, the indicator 3 is positioned in a cut-out of the focusing screen 18 of the finder as shown in FIG. 5, so that light from the indicator 3 is radiated upward through a condenser lens 19 into a pentaprism 20 and is reflected therefrom to an eye-piece 21, reaching an eye of the camera operator looking through the finder. In order to display the digital indication within the view field 16, the indicator 3 is positioned adjacent the condenser lens 19 as shown in FIGS. 6 and 7, so that light from indicator 3 passes through a convex lens 22, an optical path deflecting prism 28 and a fixed total reflection mirror 24 successively to the focusing screen 18 on which an image of the indicator 3 is formed. Light from the image on the screen 18 is radiated upward through the condenser lens 19 to the pentaprism 20 and therefrom reflected to the eye-piece 21, reaching the operator's eye. The fixed total reflection mirror 24 is mounted independently of the reflex mirror 25 of the camera 1, and is oriented at an angle, $\theta$, (which is preferably about 22.5 degrees) with respect to the optical axis of the objective lens so that the image of the indicator 3 on the focusing screen 18 is superimposed on the image of an object being photographed. If desired, the total reflection mirror 24 may be replaced by a half mirror in order to print the frame number on the film.

Figure 8:
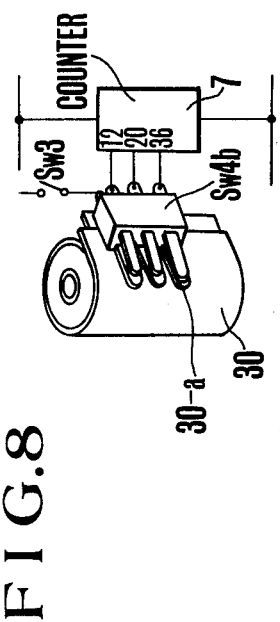
FIG. 8 is a fragmentary partly perspective partly diagrammatic view of the film counter of FIGS. 1 and 2.

In FIG. 8, there is shown another example of the construction and arrangement of the switch $SW_4$ of FIGS. 1 and 2 adapted to be set in automatic response to an insertion of a film cartridge 30 into the chamber 1a. Each of the cartridges 30 usable with such a camera is provided with a projection 30-a fixedly mounted on the peripheral housing member thereof in a position dependent upon the maximum number of frames available in the film cartridge, for example, 12 frames, 20 frames or 36 frames. When such a film cartridge 30 is loaded in the chamber 1a and the back cover 2 is closed, the projection 30-a is brought into abutting engagement with one of three movable contacts of switch $SW_4b$ which in turn is brought into contact with its paired fixed contact so that switch $SW_4b$ is set to position "36 frames."

Figure 9:
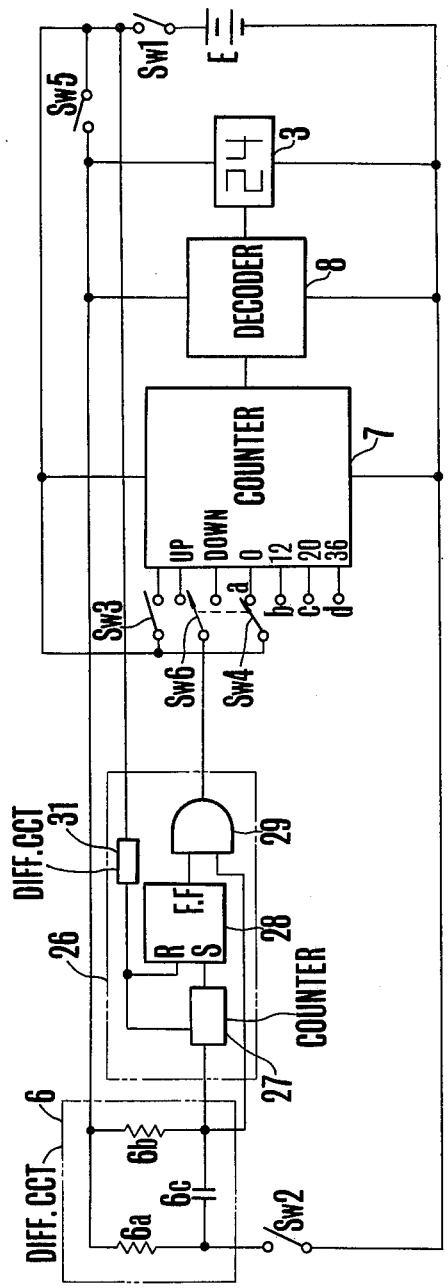
FIG. 9 is a schematic block diagram of the circuitry of FIG. 2 with a slight modification to include an idle frame counter circuit.

In FIG. 9, there is shown a modification of the digital counter circuit of FIG. 2 as provided with a blind-frame compensator 26 connected between the differenting circuit 6 and the UP-DOWN counter 7 of FIG. 2. The compensator 26 comprises a scale-of-N counter 27 performing a count of N corresponding to the number of film frames to be blind-fed and having an input terminal connected to the output terminal of the differentiating circuit 6, a flip-flop device 28 having a SET-input terminal S to which a signal from counter 27 is supplied at a count of N and having an output terminal connected to a gating control input terminal of an AND gate 29 of which the pulse input terminal is connected to the output terminal of the differentiating circuit 6, and a reset signal generator 31 which may be constructed in the form of a conventional differentiating circuit having an input terminal connected to the interconnection between the switches $SW_1$ and $SW_5$, and having an output terminal connected to the RESET-input terminal R of the flip-flop device 28 and to the RESET-input terminal of the scale-of-N counter 27 so that when the back cover 2 is closed to close switch $SW_1$, an output pulse occurring at the output terminal of the reset signal generator 31 is applied to the RESET-input terminals of counter 27 and device 28 to reset them to their respective initial states of operation. Reset signal generator 31 may be in the form of a conventional differentiating circuit, such as the differentiating circuit 6 shown in FIG. 2. Next, the camera operator may repeat the cocking operation of lever 9 N times to advance the film N frames. When N number of pulses has occurred at the output terminal of the differentiating circuit 6 and has been counted by the scale-of-N counter 27, in other words, when the Nth output pulse has occurred, the flip-flop device 28 is triggered to its second state by an output of counter 27. The output of device 28 is supplied to the gating control input of AND gate 29 so that AND gate 29 passes the Nth output pulse from the differentiating circuit 6 to the input terminal of the UP-DOWN counter 7, whereby the first count-up or count-down of 1 is effected, which is displayed by the indicator 3.

It will be seen from the foregoing description that the present invention contemplates the use of an electrical counter in place of the mechanical counter of the prior art in counting the number of film frames advanced past the film gate for purposes of increasing the flexibility of the camera design and reducing the size of the film counter. An additional advantage deriving from the utilization of the film transport sprocket as the actuating member for the film counter of the invention is that an number of exposures are made on a single frame without advancing, the count, while the prior art film conductor advances its indicator dial by the number of graduations as the cocking operation of lever 9 is repeated to reset the camera for the number of superposed exposures. Further, the provision of minimizing the consumption of the electric power of the battery is made in the switching arrangement as applying a voltage to only the UP-DOWN counter during the time when the film cartridge is loaded in the camera and to the other parts thereof during only the time when the each frame is advanced or when the operator desires to read out the number of advanced frames through the indicator 3.

What is claimed is:

1. An electrical film counter comprising a camera having a film transport mechanism and an openable back cover, and arranged to have a film cartridge inserted thereinto pulse generating means cooperable with said film transport mechanism to generate one pulse responsive to each advance of the film in said camera by one frame;

a first pulse counter having an input connected to said pulse generating means and operable to count the pulses from said pulse generating means;

film frame indicating means connected to said first pulse counter and operable to indicate the number of film frame corresponding to the content of said first pulse counter;

a source of electric potential; and first switching means placed in an "on" state responsive to closing of said back cover and placed in an "off" state responsive to opening of said back cover, said first switching means being connected between a source of electric potential and a power supply terminal of said first pulse counter to enable said first pulse counter to operate.

2. An electrical film counter, according to claim 1, in which said first switching means is disposed on said back cover and is placed in an "on" position by engagement of the film cartridge therewith, responsive to the closing of said back cover, and is placed in an "off" condition by disengaging the film cartridge therefrom, responsive to the opening of said back cover.

3. An electrical film counter, according to claim 1, in which said pulse generating means includes a differentiating circuit having its output terminal connected to said input terminal of said first pulse counter.

4. An electrical film counter, according to claim 1, further comprising decoding means connected between said first pulse counter and said film frame indicating means.

5. An electrical film counter, according to claim 1, including second switching means connected between said source of potential and power supply terminals of said pulse generating means, said decoding means and said film frame indicating means, said second switching means being placed in an "on" state only responsive to advance of film in the camera by operation of said film transport mechanism.

6. An electrical film counter, according to claim 1, in which said first pulse counter has a clearing terminal; and third switching means connected to said clearing terminal and operable to supply a clearing signal to said first pulse counter responsive to opening of said back cover.

7. An electrical film counter, according to claim 1, wherein said first pulse counter is an UP-DOWN counter having presetting terminal means.

8. An electrical film counter, according to claim 7, further comprising selector switching means connected to said presetting terminal means and operable to select the preset content of said UP-DOWN counter in accordance with the number of film frames on the film cartridge.

9. An electrical film counter, according to claim 1, further comprising counting means connected between said pulse generating means and said input terminal of said first pulse counter and operable to count a predetermined number of blind-fed film frames.

10. An electrical film counter, according to claim 9, in which said counting means comprises:
 a second pulse counter connected to said pulse generating means and operable to count the number of pulses from said pulse generating means, said second pulse counter having an output terminal;
 a flip-flop circuit having a set input terminal and an output terminal;
 counting means connected between the output terminal of said second pulse counter and the set input terminal of said flip-flop circuit; and
 an AND gate having a first input terminal connected to said flip-flop circuit and a second input terminal connected to the output of said pulse generating means, said AND gate having one output terminal connected to said input terminal of said first pulse counter.

11. An electrical film counter comprising: a camera having a film transport mechanism and a back cover; pulse generating means cooperable with said film transport mechanism to generate one pulse response to each advance of the film by one frame; a first pulse counter having an input connected to said pulse generating means and a clearing terminal and operable to count the pulses generated by said pulse generating means; film frame indicating means connected to said first pulse counter and operable to indicate the number of film frames corresponding to the content of said first pulse counter; and switching means connected to said clearing terminal of said first pulse counter and operable, responsive to the opening of said back cover of the camera, to apply a clearing signal to said first pulse counter.

12. An electrical film counter comprising: a camera having a film transport mechanism; pulse generating means cooperable with said film transport mechanism to generate one pulse response to each advance of the film by one frame; a first pulse counter having an input connected to said pulse generating means and operable to count in the pulses generated by said pulse generating means; film frame indicating means connected to said first pulse counter and operable to indicate the number of film frames corresponding to the content of said first pulse counter; a source of electric potential; and first switching means placed in an "on" state responsive to a preparatory operation of the camera for photographing and placed into an "off" state responsive to a photographing terminating operation, said first switching means being connected between said source of potential and a power supply terminal of said first pulse counter to enable said first pulse counter to operate; said first pulse counter being an UP-DOWN counter having presetting terminal means.

13. An electrical film counter, according to claim 12, further comprising selector switching means connected to said presetting terminal means and operable to select the preset content of said UP-DOWN counter according to the number of film frames on a film in said camera.

14. An electrical film counter comprising: a camera having a film transport mechanism; pulse generating means cooperable with said film transport mechanism to generate one pulse responsive to each advance of the film in said camera by one frame; a first pulse counter having an input connected to said pulse generating means and operable to count the pulses from said pulse generating means; film frame indicating means connected to said first pulse counter and operable to indicate the number of film frames corresponding to the content of said first pulse counter; a second pulse counter connected to said pulse generating means and operable to count the number of pulses from said pulse generating means, said second pulse counter having an output terminal; a flip-flop circuit having a set input terminal and an output terminal; connecting means connecting the output terminal of said second pulse counter to the set input terminal of said flip-flop circuit; and an AND gate having a first input terminal connected to the output terminal of said flip-flop circuit and a second input terminal connected to the output terminal of said pulse generating means, said AND gate having one output terminal connected to the input terminal of said first pulse counter.

* * * * *